A. L. KREISS.
PHOSPHATE FERTILIZER CONTAINING POTASSIUM OR SODIUM AND PROCESS OF PRODUCING THE SAME.
APPLICATION FILED SEPT. 13, 1921.
1,413,168.
Patented Apr. 18, 1922.
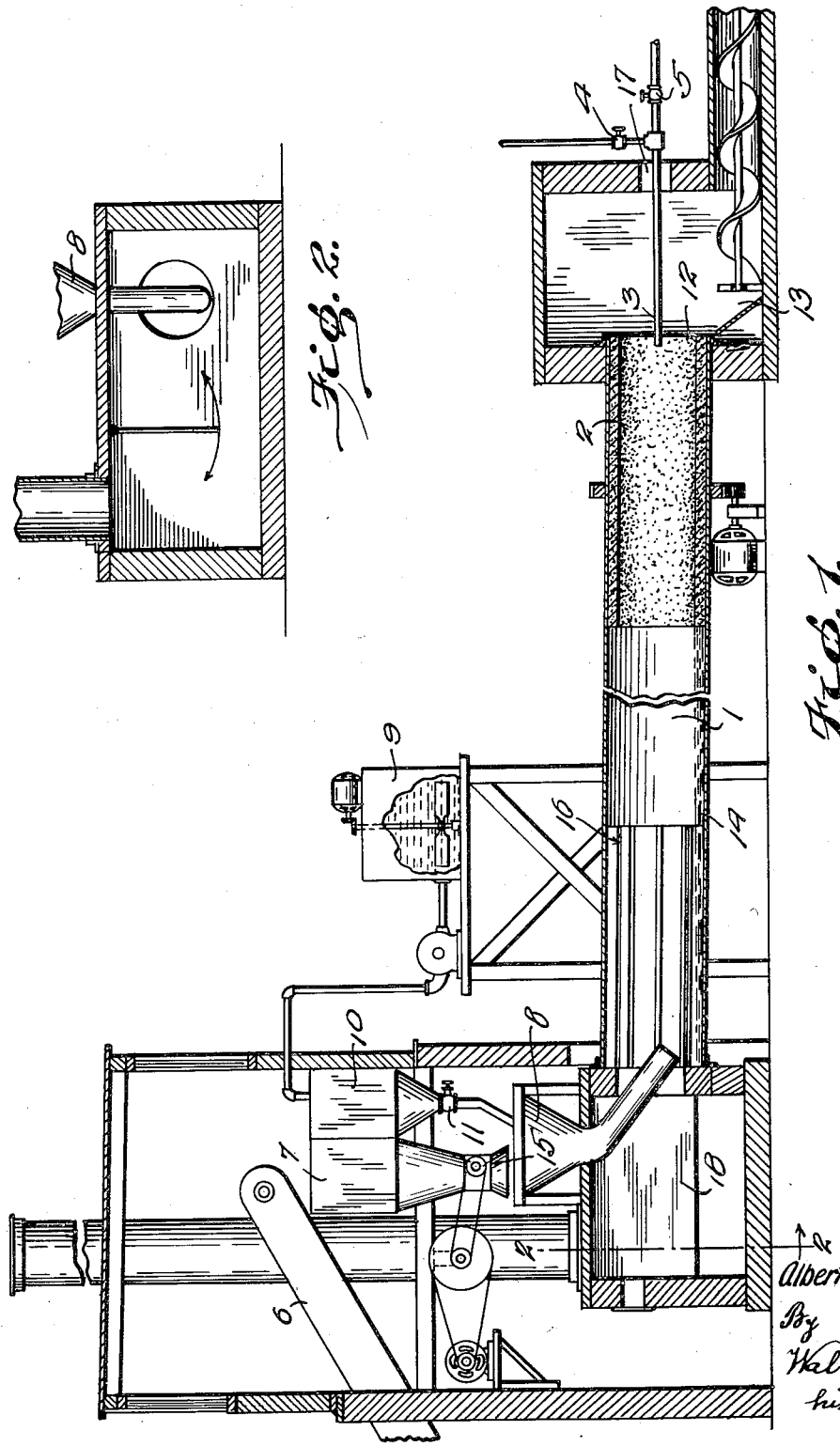

UNITED STATES PATENT OFFICE.

ALBERT LOUIS KREISS, OF JACKSONVILLE, FLORIDA.

PHOSPHATE FERTILIZER CONTAINING POTASSIUM OR SODIUM AND PROCESS OF PRODUCING THE SAME.

1,413,168.  Specification of Letters Patent.  Patented Apr. 18, 1922.

Application filed September 13, 1921. Serial No. 500,411.

*To all whom it may concern:*

Be it known that I, ALBERT LOUIS KREISS, a citizen of the United States of America, and a resident of the city of Jacksonville, in the county of Duval and State of Florida, have invented or discovered a new and useful Improvement in Phosphate Fertilizers Containing Potassium or Sodium and Processes of Producing the Same, of which the following is a specification.

This invention is an improvement on a process for which I was granted U. S. Letters Patent No. 1,366,569, January 25, 1921. The subject matter of this patent makes possible the successful and economic production of phosphate fertilizer containing potassium without the use of a mineral acid or acid salt by heating potassium silicates, phosphates and alkali metals, thus utilizing the natural potassium deposits especially of the western United States of America.

My present invention is an improvement on my former invention described in my said Letters Patent No. 1,366,569, because it makes possible the substitution of other potassium salts and artificial fluxes for the purpose of producing fertilizer in combination with phosphate rock.

While there have been many attempts made to produce available phosphate from phosphate rock by fusion or furnacing methods in combination with the salts of mineral acids, hitherto, these attempts have not been commercially successful, because the means employed do not give a satisfactory end or finished product, or the operation is prohibitive in cost because of the expense of the means employed for creating the high temperatures required to accomplish the chemical reaction involved and by which high temperature, the phosphoric acid is volatilized in whole or in part thus requiring complicated apparatus for recovering the volatilized products, enormous fuel consumption and an unsatisfactory final product for the reason that there is a partial reversion of the reaction when the material is subjected to high temperatures or to prolonged heating at lesser temperatures.

Furthermore, these former efforts to produce phosphate fertilizers by furnacing, attempt to secure the necessary intimate mixture of the insoluble phosphate rock with the mineral salts by means of mechanically grinding the materials to a fine powder or they first grind the material and then mix with water to form a paste, or mud, from the ingredients to be calcined before subjecting it to the reaction temperature. Obviously such preliminary preparation of the materials causes added operating costs and expensive machinery, which I have found to be disadvantageous and unnecessary.

My process is made possible by the discovery that the following combination of steps renders reaction practically complete, obviates the expensive grinding, prevents the reversion of the reaction and produces an end product with minimum volatilization of phosphoric acid or potassium salts. These steps may be described as follows:

First: I have discovered that by taking phosphate rock, as mined and which may be unground, and heating it to a temperature between 100 and 500 degrees centigrade, on a moving surface, preferably of metal, and dropping it into a solution of mineral salts, the rock will be caused to explode and disintegrate or burst into a finely divided state and become thoroughly impregnated with the mineral salts, and thus the contact surface of the reaction agents are increased to a maximum.

In practice, I have found that unground phosphate rock when treated as above set forth will, when calcined, give a yield of available phosphate from 90% to 96% of theory and that substantially the same result is secured when the rock is ground.

Secondly: I have further discovered that a proper fusion for the completion of the reaction can be secured, a reversion of the reaction prevented and volatilization of both potassium salts and phosphoric compounds reduced to a minimum, when the mixed mass as prepared under the first step, of my invention is subjected to a temperature high enough and for a time long enough to obtain reaction; but not sufficient to cause either reversion of reaction or volatilization.

Thirdly: I have further discovered that a reducing atmosphere produced by a flame promotes reaction and aids in its completion, more especially when said reducing flame is projected directly into a brick lined portion of the drier, which is called the reaction chamber, containing the mass as prepared under the first step of my invention.

Fourthly: I have further discovered that my invention can be carried out in a rotary drier, by means of which continuous and uniform operation can be accomplished and that by maintaining the drier at a decreasing temperature from the discharge end to the feed end of same, it is unnecessary as with other processes, to install a brick or refractive material lining within the drier excepting only for a short distance from the discharge end of the drier where it is in direct contact with the heating flame. This distance may be for example 10 to 12 feet when a 50 foot drier is used. I am able also to regulate the reducing flame so that the required minimum temperature necessary for reaction, may be obtained and at the same time utilize the heat from this source for the purpose of securing the proper physical admixture of the materials as stated in the first step of my invention herein mentioned.

Fifthly: the further discovery that a mixture of more than one alkali metal salt will constitute a flux which, when properly incorporated with the insoluble phosphate rock, will reduce the temperature at which the reaction takes place under the conditions as outlined in the steps above mentioned, thus making possible the commercial production sought without the high temperature and long heating required by other processes, thus reducing the time factor for reaction to a minimum, thereby reducing losses by volatilization or dissociation to a minimum.

Sixthly: The further discovery that potassium salts may be employed by my process instead of calcium, or sodium, salts, or in combination with them when subjected to the conditions as set forth in the steps of my process thereby producing an end product containing potassium which is a necessary part of a complete fertilizer.

Seventhly: I have further discovered that the reducing flame mentioned in the third step can be produced by atomizing or spraying fuel oil with steam. The steam serving the triple purpose of spraying the oil, maintaining a more even distribution of the heat within the drier and lowering the temperature of the flame.

Briefly stated then my process consists of the following steps:

1st. Intimately mixing one or more alkali metal salts with phosphate rock by dropping the heated rock into a water solution of the salt.

2nd. Minimum temperature of reaction coincident with minimum time of reaction.

3rd. A reducing flame or atmosphere for the promotion of reaction.

4th. Low temperature of reaction accomplished by a mixture of more than one alkali metal salt used as a flux.

5th. Entire process carried out in one continuous operation by using a rotary drier.

6th. A finished product containing substantially all of the phosphoric and potassium content of the original material used.

7th. Even distribution of temperature and the spraying of oil by means of steam.

Having thus set forth the important steps in my improved process, the apparatus employed by me may be described as follows:

In order that my invention may be fully understood I will proceed to describe it with reference to the accompanying drawings, in which:

Figure 1 is a longitudinal section of my improved apparatus for carrying out my new process.

Figure 2 is a detail view showing a vertical section through the dust chamber on the line 2—2 of Figure 1.

Referring to the drawing:

1 is a rotary drier which may be of any suitable size and built under the usual plans of drier installation and while not confining myself to any particular size or design; for the purpose of illustration, I am describing a plant built and operated by me at Merriman, Nebraska. This drier is 50 feet in length and 5 feet in diameter. 2 is a brick lining extending 12 feet from the discharge end of the drier and which I call the reaction chamber. 3 is an oil burner which is operated by valve 4, the oil being atomized, or sprayed, by means of steam entering through the valve 5. 6 is a bucket or suitable conveyor which carries the phosphate rock to a hopper 7 from which an even and gradual discharge is made into a chute 8, which in turn discharges into the drier 1. 9 is a tank having suitable mixing apparatus for dissolving one or more alkali metal salt which is then pumped into feed tank 10, and is then discharged through a valve 11 into the hopper 8. 12 is an opening in the discharge end of the drier from which the furnaced material discharges into a receiver 13, from which it is carried through a cooling room partly shown, and then to a suitable crusher and mill, not shown, but which may be of any suitable or standard design, where the material is powdered for use as a fertilizer or to be mixed with other ingredients for the manufacture of a complete fertilizer.

18 is a chamber installed at the feed end of the drier which serves the double purpose of enclosing the feed end of the furnace so that a suitable draft may be secured from the stack thus quickly carrying away the burnt gases and also to collect any of the entrained material which may be mechanically carried along by the gases and steam formed during the operation.

In the operation of my process, it is evident that a wide variation as to use and proportion of ingredients and inclusion of added steps are made necessary by the difference in materials from which the finished product is to be made. This variation in operation will not operate to depart from the true spirit of the invention. A typical operation may be described as follows:—

A brine solution of a gravity of between 10 and 15 Baumé is made in the mixing tank 9. This solution for example may contain 15% of total solids, 34% of which is sodium carbonate, 56% sodium sulphate and the remaining 10% potassium carbonate. After dissolving these salts in water so that the solution will stand between 10 and 15 Baumé, it is pumped into the feed tank 10. When this tank is filled, the oil burner at 3 is lighted and put in operation by atomizing the oil with steam, into the brick lined part of the drier, or reaction chamber 2. The hopper 7 is filled with phosphate rock by the conveyor 6. Then the drier is started revolving, and the valve 11 from the feed tank is opened, allowing the brine solution to run through the chute 8, forming a pool 14 of brine in the bottom of the drier. This pool 14 of brine being made possible by the offset caused by the thickness of the brick lining of the reaction chamber 2 and the inner flange on the feed end of the drier. As soon as this pool 14 of brine is formed then the valve 15 from the phosphate hopper 7 is opened and an even rate of discharge of both rock and brine from the hopper 7 and the feed tank 10 is maintained at the approximately relative rate of 2000 pounds of phosphate rock per hour to 575 pounds of solids in solution per hour. This solution comes in contact with the phosphate rock in chute 8 and all not immediately absorbed by the rock drops to the bottom of the drier 1, thus maintaining the pool of brine constant in amount and strength and replacing the loss occasioned by evaporation and absorption by the phosphate rock.

The phosphate rock drops into the pool of brine in the bottom of the drier and is carried upward by means of friction and the angle flights 16 provided for this purpose. It is obvious that the top portion of the drier is much hotter than the bottom portion and the phosphate rock as it is carried upward becomes hot. When it reaches the top it falls back into the pool of brine where it bursts or explodes, and disintegrates into a finely divided state.

Owing to the fact that the drier is set on a slight decline, that is about $\frac{1}{8}$ inch to $\frac{1}{4}$ inch to the foot, the material is carried slowly toward the discharge end of the drier 1, thus the phosphate rock is repeatedly carried upward to the hottest part of the drier 1 and repeatedly drops into the brine solution where it explodes so that when it reaches the reaction chamber 2 it is thoroughly disintegrated and intimately mixed with the alkali metal salts. As soon as it reaches the reaction chamber 2 it comes in contact with the reducing flame, and on account of the intimate mixture, secured in the drier 1 as described, is in proper physical condition to secure maximum results from the chemical reaction which immediately takes place.

The water carried along with the bursted or disintegrated phosphate rock together with the steam employed in atomizing the oil, tends to a reduction of temperature and to cause an even distribution of the flame and heat required for the reaction thereby reducing losses from dust formation and volatilization to a minimum and also prevents the chemical dissociation of the reaction products.

The actual temperature required in the mixture and within the reaction chamber of the drier is dependent on the character of the flux employed and the impurities contained in the phosphate rock and therefore a definite temperature for all operations can not be given. In practice, however, I have found that, for example: Tennessee rock containing many impurities, can be handled at a temperature as low as 500 to 700 degrees centigrade when the above mentioned flux is used. If however potassium and sodium sulphate only are used I have found that a temperature as high as approximately 1072 degrees centigrade, is required. If potassium carbonate is substituted then approximately 909 degrees centigrade will accomplish the result. Approximately 846° centigrade if sodium carbonate is used and approximately 888 if sodium sulphate is used. In other words, the temperature becomes high enough in each instance to cause reaction to take place; but not sufficient to dissociate the reaction product which is a very important point in the process.

The mass, or clinker, formed in the reaction chamber is carried through the reaction chamber 2 and through the discharge end 12 into the receiver 13 and then into a cooling bin partly shown from which it is carried to a suitable crusher and grinder, not shown, and is ground for use either for fertilizer or a component part of a fertilizer. It should be here mentioned that there is a tendency for the clinker to adhere to the brick surface of the reaction chamber, and I have found it necessary to remove the clinker by a hand poker introduced at 17.

By following my process, as described I am able to operate within the range of commercial practicability and succeed in securing 90 to 96 per cent of all the calcium phosphate as available, approximately 90% being citrate soluble and 4% to 6% water soluble, and at the same time have reduced the volatilization of the phosphoric acid and potash to a minimum. Any small amount mechanically carried by the steam and gases is caught in the chamber 18.

Having thus described my invention the following is what I claim as new therein and desire to secure by Letters Patent:

1. The process of treating phosphate rock to produce a phosphate fertilizer which consists in feeding phosphate rock into a heated drier containing a solution of alkali metal salt.

2. The process of disintegrating phosphate rock to produce a phosphate fertilizer which consists in feeding phosphate rock into a heated drier containing a solution of more than one alkali metal salt and then calcining the disintegrated mixture.

3. The process of disintegrating and intimately mixing phosphate rock to produce a phosphate fertilizer containing potassium by feeding phosphate rock into a heated drier having a water solution of a potassium salt, drying and calcining such intimate mixture by means of a reducing atmosphere.

4. The process of disintegrating and intimately mixing phosphate rock to produce a phosphate fertilizer containing potassium by feeding phosphate rock into a heated drier having a water solution of a potassium salt, drying and calcining such intimate mixture by means of a reducing flame.

5. The process of intimately mixing phosphate rock with an alkali metal salt for the production of a fertilizer compound by dropping heated phosphate rock into a heated solution of an alkali metal salt, evaporating the water content and calcining this incorporated mixture at a temperature sufficient to cause reaction; but not sufficient to volatilize.

6. The process of preparing phosphate rock before calcining with an alkali metal salt, which consists in, first bursting the rock by heating and dropping it into a solution of alkali metal salt, drying the mixture thus made and calcining at a temperature high enough to cause reaction; but not volatilization, and for a time long enough for reaction, but not sufficient to dissociate the product formed.

7. Means for disintegrating phosphate rock by dropping the heated rock into an alkali metal salt solution, means for evaporating the mixture thus formed and means for calcining said mixture at a temperature sufficient to cause chemical reaction, but not sufficient to volatilize the reaction product formed.

8. The process of continuously producing a phosphate fertilizer containing potassium by first incorporating an alkali metal flux, composed of potassium and other alkali metal salts, with phosphate rock by continuously dropping the heated phosphate rock into a solution of the flux, continuously replacing the consumed and evaporating flux solution, drying said incorporated mass and calcining same in a reducing atmosphere, at a temperature sufficient to cause chemical reaction to take place, but not sufficient to volatilize the products of reaction, and for a time long enough to complete reaction but not long enough to dissociate the products of reaction.

9. The process of continuously producing a phosphate fertilizer containing potassium by first incorporating an alkali metal flux, composed of potassium and other alkali metal salts, with phosphate rock by continuously dropping the heated phosphate rock into a solution of the flux, continuously replacing the consumed and evaporated flux solution, drying said incorporated mass and calcining same by means of a reducing flame projected on the incorporated mass at a temperature sufficient to cause chemical reaction to take place, but not sufficient to volatilize the products of reaction, and for a time long enough to complete reaction but not long enough to dissociate the products of reaction.

10. In a process for producing a phosphate fertilizer which consists of heating a wet intimately incorporated mixture of phosphate rock and alkali metal salts for a time long enough and at a temperature high enough to cause reaction to take place; but not for a time long enough or at a temperature high enough to volatilize or dissociate the reaction product formed; the use of a reducing atmosphere to aid reaction.

ALBERT LOUIS KREISS.